United States Patent [19]
Hikmet et al.

[11] Patent Number: 5,940,211
[45] Date of Patent: Aug. 17, 1999

[54] OPTICAL SYSTEM WHICH UTILIZES POLARIZED LIGHT

[75] Inventors: Rifat A. M. Hikmet; Henri M. J. Boots; Reinhold Wimberger Friedl, all of Eindhoven, Netherlands

[73] Assignee: U.S. Philips Corporation, New York, N.Y.

[21] Appl. No.: 08/834,408

[22] Filed: Apr. 16, 1997

[30] Foreign Application Priority Data

Apr. 26, 1996 [EP] European Pat. Off. .............. 96201142

[51] Int. Cl.⁶ ........................................................ G02B 5/30
[52] U.S. Cl. ............................................. 359/490; 359/492
[58] Field of Search .................................. 359/485, 487, 359/488, 490, 492, 495; 349/9

[56] References Cited

U.S. PATENT DOCUMENTS 4,985,809  1/1991  Matsui et al. .
5,422,756  6/1995  Weber ..................................... 359/487
5,486,884  1/1996  De Vaan .

OTHER PUBLICATIONS

"Polarizer" in Research Disclosure, Jul. 1993, No. 35117, pp. 452–453.

Primary Examiner—Thong Nguyen
Assistant Examiner—Craig Curtis
Attorney, Agent, or Firm—F. Brice Faller

[57] ABSTRACT

An optical system includes comprising a polarizing element in the form of a layer which comprises an isotropic material having a refractive index $n_i$ and an anisotropic material having refractive indices $n_{a,e}$ and $n_{a,o}$. The refractive index $n_i$ is substantially equal to $n_{a,e}$ or $n_{a,o}$. The optical system includes a retroflector for back-reflecting the polarization component diffused in the polarizing element.

14 Claims, 5 Drawing Sheets

OPTICAL SYSTEM WHICH UTILIZES POLARIZED LIGHT

BACKGROUND OF THE INVENTION

The invention relates to an optical system comprising a polarizing element in the form of a layer comprising an isotropic material having a refractive index ni, and an anisotropic material having refractive indices $n_{a,e}$ and $n_{a,o}$, in which $n_i$ is substantially equal to $n_{a,e}$ or $n_{a,o}$.

The invention also relates to a flat picture display device and to an image projection device provided with such an optical system.

A polarizing element as described in the optical system of the type described in the opening paragraph is known from, for example the publication: "Polarizer" in Research Disclosure, July 1993, no. 35117, pp. 452–453.

The polarizer described in this publication comprises a layer of birefringent material which is present between two glass plates and in which glass granules are distributed. The glass granules have a refractive index which is equal to the ordinary refractive index of the birefringent material. Consequently, an unpolarized light beam incident on the polarizer will fall apart into an ordinary and an extraordinary beam component. Since the glass granules have a refractive index which is equal to the ordinary refractive index of the birefringent material, the ordinary beam component will be passed, whereas the extraordinary beam component will be diffused in the layer and consequently disappears from the light path.

A drawback of such a polarizer is that substantially half the intensity of an incident light beam is lost because the beam component having the unwanted direction of polarization is removed from the light path.

SUMMARY OF THE INVENTION

It is an object of the invention to provide an optical system which can be manufactured in a relatively simple manner and in which one of the polarization components is diffused in a controllable way so that this component, if desired, can be recuperated.

To this end, the optical system according to the invention is characterized in that the optical system comprises means for retroreflecting at least a part of a polarization component diffused in the polarizing element.

The operation of the optical system is based on the fact that, due to the polarizing element, there is a separation of polarization between the ordinary and extraordinary radiation, while one of the polarization components is passed substantially undeflected. The complementary polarization component is diffused in such a way that retroreflection of this component is made possible, instead of this component being arbitrarily diffused from the light path. In this way it is possible to recuperate the diffused polarization component.

The means for retroreflecting light with the diffused polarization direction may be implemented in different manners.

A first embodiment of the optical system according to the invention is characterized in that the anisotropic material is formed by particles for which it holds that:

$$0.5\lambda < \emptyset < 10\lambda$$

in which $\emptyset$ is the dimension of the particles in the anisotropic direction, and in that it holds for the distance d between the particles that:

$$10\lambda > d > 0.5\lambda$$

and for the refractive indices:

$$0.3 > |n_i - n_{a,e}| > 0.01.$$

When the dimension of the particles in the anisotropic direction, their mutual distance and said refractive indices satisfy the above-mentioned relations, the diffused polarization component will undergo retroreflection. In this case, the means are comprised in the layer with particles.

A second embodiment of the optical system according to the invention is characterized in that the means for retroreflection are constituted by a flat element which is provided with a relief structure on a side facing the polarizing element, this element having a reflective effect for light rays with an angle of incidence which is larger than a critical angle $\theta_c$.

The dimensions of the particles and their mutual distance are now less important. The extraordinary light rays should now be deflected only at such an angle with respect to the normal on the polarizing element that they are incident on the flat element at an angle $\theta$ which is larger than $\theta_c$. $\theta_c$ is the minimum angle for which reflection occurs. For angles which are smaller than this critical angle, there is transmission. For angles which are larger than this critical angle, the light rays will be back-reflected.

A further embodiment of the optical system according to the invention is characterized in that $0 \leq |n_i - n_{a,o}| < 0.05$.

When the particles also meet these requirements, the polarizing element behaves as a diffuser for the undeflected transmitted radiation so that a homogeneous light distribution on the surface of the polarizing element is obtained.

Diffusing one of the polarization components in a controlled way provides the possibility of recuperating the diffused polarization component so that it can be converted into light having a direction of polarization which corresponds to the non-diffused polarization component. In this way, an unpolarized beam may be converted substantially completely into a beam having the same direction of polarization without a considerable quantity of the incident light beam getting lost.

To this end, a further embodiment of the optical system according to the invention is characterized in that the optical system further comprises means for at least partly converting the diffused polarization component into a complementarily polarized component.

It is thereby achieved that light with the direction of polarization diffused by the polarizing element is recuperated and is each time partly converted into light with the direction of polarization to be transmitted in an undiffused way.

A further embodiment of the optical system according to the invention is characterized in that the means for polarization conversion are constituted by a depolarizer and a reflector.

A reflector preceded by a depolarizer is present on the side located opposite the side on which the light to be polarized is incident. In this way, the retroreflected light will be depolarized and subsequently sent by the reflector to the polarizing element again. As a result of depolarization, half of this light will have obtained the direction of polarization which is suitable for the polarizing element and will consequently be transmitted by the polarizing element. In this way, the retroreflected light is recuperated and at least partly converted into light having a direction of polarization which corresponds to that of the undiffused component. By repeating this process, substantially all the incident unpolarized light can be converted into light having substantially the same direction of polarization without any noticeable loss of intensity.

The optical system as described hereinbefore may be used in flat picture display devices operating with peripheral lighting, background lighting or ambient light.

These and other aspects of the invention will be apparent from and elucidated with reference to the embodiments described hereinafter.

DETAILED DESCRIPTION OF THE PREFERRED EMBODIMENTS

Figure 1:
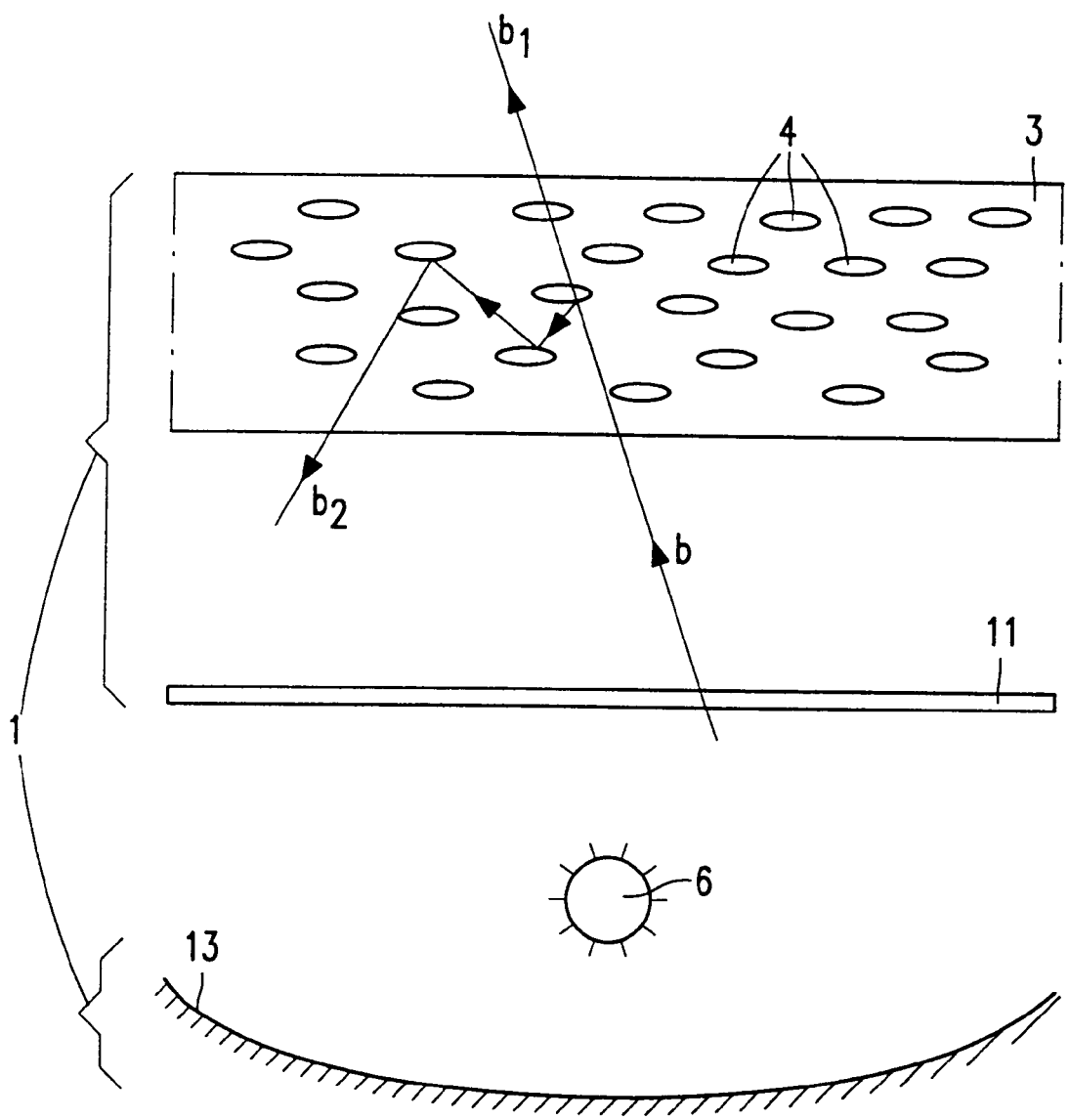
FIG. 1 shows a first embodiment of an optical system according to the invention and also illustrates the radiation path of a light beam b incident on the polarizing element.

The illumination system 1 shown diagrammatically in FIG. 1 includes an optical system comprising a polarizing element 3, and further includes a radiation source 6. The polarizing element 3 is constituted by a layer comprising an isotropic material having a refractive index $n_i$ and an anisotropic material having refractive indices $n_{a,e}$ and $n_{a,o}$. When unpolarized light coming from the radiation source 6 is incident on such a layer, this light will be separated into an ordinary and extraordinary polarization component. When, for example, $n_i = n_{a,o}$, the ordinary polarization component will undergo no refractive index difference upon passage through the layer and will consequently be transmitted. However, the extraordinary polarization component will undergo a refractive index difference and be diffused in the layer. If no extra measures are taken, the diffused component will be diffused arbitrarily and disappear from the light path so that substantially half the intensity supplied by the light source is lost. To prevent this, the present invention ensures that one of the polarization components is diffused in a controlled manner so that it is possible to recuperate it and subsequently at least partly convert it into light having a direction of polarization which corresponds to that of the undiffused polarization component.

There are different possibilities for this purpose. A first possibility is to implement the polarizing element 3 as a layer with particles 4 or a layer with clusters of particles satisfying the following conditions:

$$0.5\lambda < \emptyset < 10\lambda$$

$$10\lambda > d > 0.5\lambda$$

in which $\emptyset$ is the dimension of the particles or of a cluster of particles in the anisotropic direction, $\lambda$ is the wavelength of light from the radiation source, and d is the distance between the particles or the clusters, while it holds for the refractive indices that:

$$0.3 > |n_i - n_{a,e}| > 0.01$$

in which $n_i$ is the refractive index of the isotropic material and $n_{a,e}$ is the extraordinary refractive index of the anisotropic material.

When these conditions are satisfied, the diffused polarization component will be back-reflected towards the radiation source 6, in other words, it will undergo retroreflection.

Figure 2:
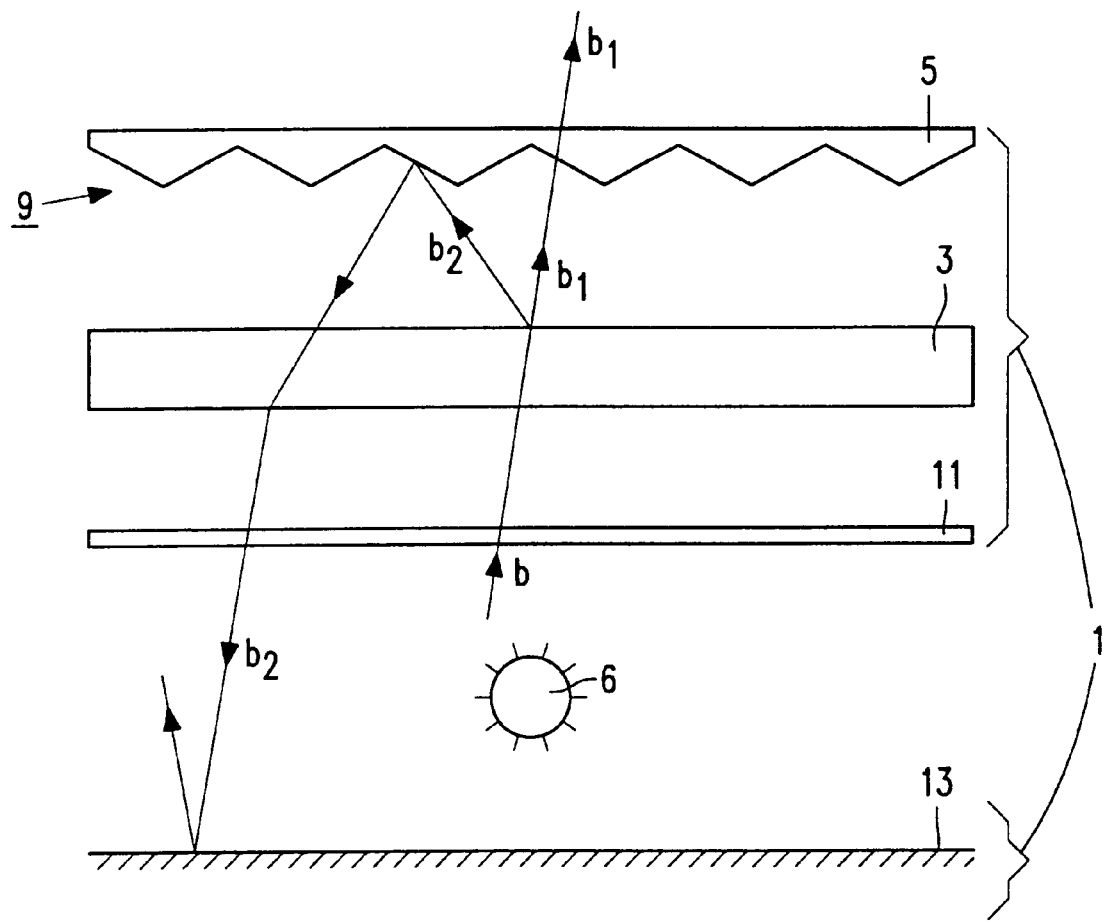
FIG. 2 shows a second embodiment of an optical system according to the invention and also illustrates the radiation path of a light beam b incident on the polarizing element.

Another way of achieving that the diffused polarization component is back-reflected towards the radiation source 6, is to alleviate the requirements imposed on the distance between the particles or the clusters and their dimensions in the anisotropic direction in such a way that the diffused polarization component is deflected in a controlled manner with respect to the normal of the polarizing element instead of being back-reflected by this layer. In this case, the optical system comprises a polarizing element 3 and a flat element 5 arranged on the side of the polarizing element 3 facing away from the radiation source, which flat element has a relief structure 9 facing the polarizing element 3. This possibility is illustrated in FIG. 2. The relief structure 9 may be, for example a prism foil. The flat element 5 will function as a reflecting element. The reflective effect of the relief structure is determined by the apex angles of the prisms. In fact, they determine the critical angle $\theta_c$, in other words, the angle from which reflection occurs. Light which is incident at an angle smaller than $\theta_c$ is passed by the relief structure, whereas there is reflection on the relief structure for angles of incidence which are larger than $\theta_c$. In the given example, the ordinary polarization component will be passed and the extraordinary polarization component will be reflected. To this end, the extraordinary beam should be incident on the flat element 5 at an angle which is larger than $\theta_c$. The angle at which the deflected component will leave the polarizing element 3 is determined, inter alia by the extent of birefringence of the anisotropic material.

In the two possibilities described for the optical system, in which the diffused polarization component is back-reflected towards the radiation source, the optical system may be further provided with a depolarizing element 11 and a reflector 13. The depolarizing element 11 may be, for example a birefringent foil. The extraordinary polarization component is converted by this element into an unpolarized beam so that approximately half of this beam acquires a direction of polarization which can be passed undeflected by the polarizing element 3. The reflector 13 ensures that the depolarized light reaches the polarizing element 3 again. The depolarizing element 11 and the reflector 13 may be implemented as a single element 11 combining the two functions. Such an element should then be present on the side of the radiation source 3 facing away from the polarizing element.

In principle, both the ordinary polarization component and the extraordinary polarization component may be diffused in the layer 3. The refractive indices $n_{a,o}$ and $n_{a,e}$ of the anisotropic material determine which of the two polarization components will be diffused.

The polarizing element 3 may consist of, for example a layer of anisotropic material in which isotropic particles are dispersed as described, for example in the publication: "Polarizer" in Research Disclosure, July 1993, no. 35117, pp. 452–453. However, the layer may alternatively consist of isotropic material in which anisotropic particles are dispersed. Some examples of materials will be described hereinafter.

FIG. 1 also illustrates the radiation path of a light beam b. An unpolarized beam b is incident on the depolarizing element 11 so that the beam remains unpolarized. The ordinary beam component $b_1$ and the extraordinary beam component $b_2$ are separated from each other in the polarizing element 3. The ordinary beam component $b_1$ is passed undeflected. The extraordinary beam component $b_2$ is reflected in a multiple way so as to be ultimately sent towards the radiation source.

FIG. 2 also shows a depolarizing element 11 and a reflector 13. For example, the ordinary beam component $b_2$ of a light beam b is passed undeflected, whereas the extraordinary beam component $b_2$ is deflected with respect to the normal on the polarizing element in such a way that it is incident at an angle larger than $\theta_c$ on the flat element 5 and is reflected thereby. Consequently, this beam component will again be deflected in the polarizing element so that this component is sent towards the radiation source 6. The component $b_2$ is depolarized by the depolarizing element 11 and reflected by the reflector 13. Upon arrival at the polarizing element 3, substantially half this component will have the desired direction of polarization and consequently be passed undeflected. Since this process is repeated time and again, the greater part of the light incident on the optical system is converted into light having the same direction of polarization without any noticeable loss of intensity occurring. One of the two polarization components is diffused and can subsequently be recuperated, with at least a part being converted into light having the other direction of polarization.

The polarizing element 3 preferably also acts as a diffuser for the desired polarization component, in this example, the ordinary polarization component. This can be achieved by ensuring that:

$$0 \leq |n_i - n_{a,o}| < 0.05$$

In this way, a homogeneous light distribution on the surface of the polarizing element is obtained.

Some applications in which the optical system according to the invention can be used to great advantage will be discussed hereinafter.

A first application relates to a flat picture display device. Such a picture display device may be of the type using background lighting or of the type using peripheral lighting.

A flat picture display device comprises an illumination system for supplying an illumination beam. The illumination beam is incident on a picture display panel which will modulate the illumination beam in conformity with picture information to be displayed. The picture display panel may be, for example, a liquid crystalline picture display panel of the TN type (Twisted Nematic), the STN type (Super Twisted Nematic) or the FLC type (Ferro-electric Liquid Crystal). For such panels, the incident radiation should be polarized because the picture information to be displayed is added by modulating the state of polarization of the beam incident on the panel. To this end, a polarizer is generally arranged between the illumination system and the picture display panel. The polarizer may alternatively form part of the illumination system. An analyzer ensuring that modulated light giving rise to dark picture portions is eliminated from the light path is arranged on the other side of the picture display panel. In the flat picture display device according to the invention, the conventional polarizer is replaced by a polarizing element 3 or a polarizing element 3 and a flat element 5, either or not in combination with a depolarizing element 11 and a reflector 13, or either or not in combination with an absorbing element 14. The different possibilities are illustrated with reference to some examples.

Figure 3A:
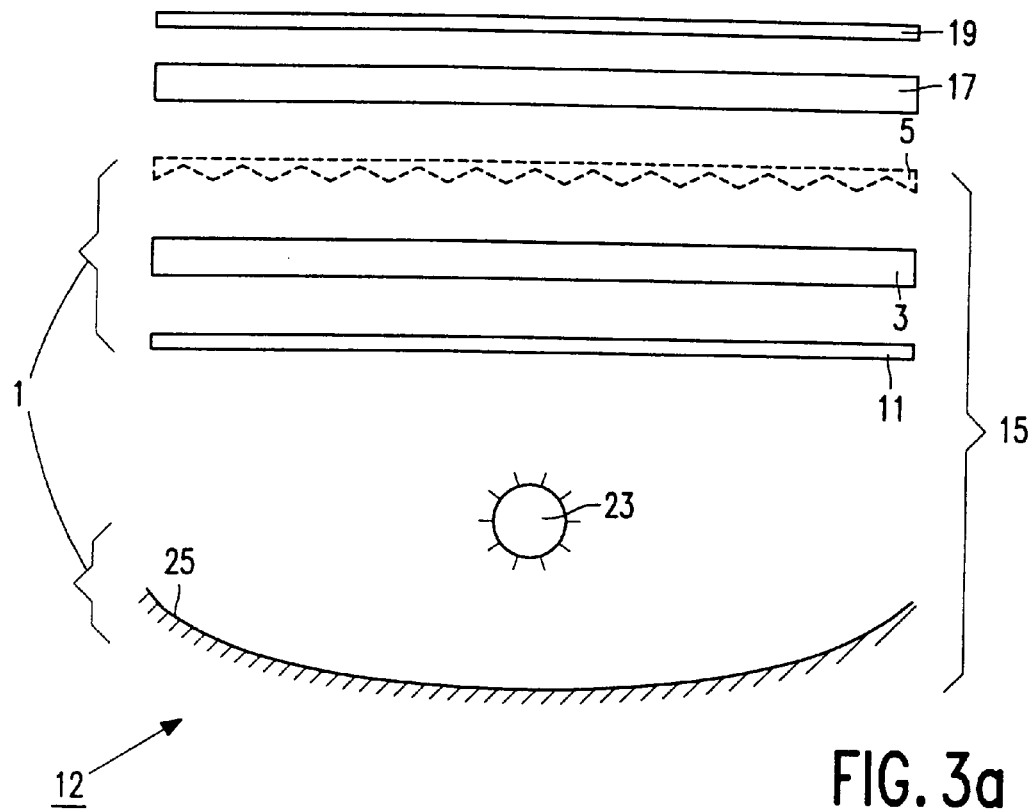
FIGS. 3(a) and 3(b) show two embodiments of a flat picture display device with background lighting and peripheral lighting, respectively, according to the invention.

FIG. 3(a) shows an embodiment of a flat picture display device 12 of the type using background lighting which includes an illumination system 15, a picture display panel 17, and an analyzer 19. The illumination system 15 comprises a light source 23 behind which a reflector 25 is arranged. The reflector 25 ensures that light transmitted in a direction away from the picture display panel 17 as yet reaches the picture display panel 17. The combination of the polarizing element 3, the depolarizing element 11 and the reflector 25 may be considered as the optical system. If the polarizing element 3 is implemented in such a way that the diffused direction of polarization is not reflected but is deflected in the forward direction, the optical system may be extended with a flat element 5, as is the case in the embodiment shown in FIG. 2. Since the presence of the flat element 5 depends on the implementation of the polarizing element 3, the flat element is shown in broken lines. The functions of the reflector and of the depolarizing element may be combined in one and the same element which should then be arranged at the side of the radiation source 23 facing away from the polarizing element 3. One direction of polarization of the unpolarized light originating from the radiation source 23 is passed undeflected by the polarizing element 3 and subsequently modulated by the picture display panel 17. The other direction of polarization is, for example back-reflected towards the radiation source 23, depolarized by the depolarizing element 11 and reflected back to the polarizing element 3 again by the reflector 25. Approximately half thereof will have the direction of polarization suitable to be passed and will contribute to the formation of the picture. The process is repeated for the other half. If the polarizing element 3 is combined with a flat element 5, the back-reflection will be ensured by the flat element instead of by the polarizing element 3 itself and will be determined by the critical angle $\theta_c$. In both cases, the greater part of the light supplied by the radiation source 23 will be converted into light having the same direction of polarization and will consequently contribute to the formation of the picture.

Figure 3B:
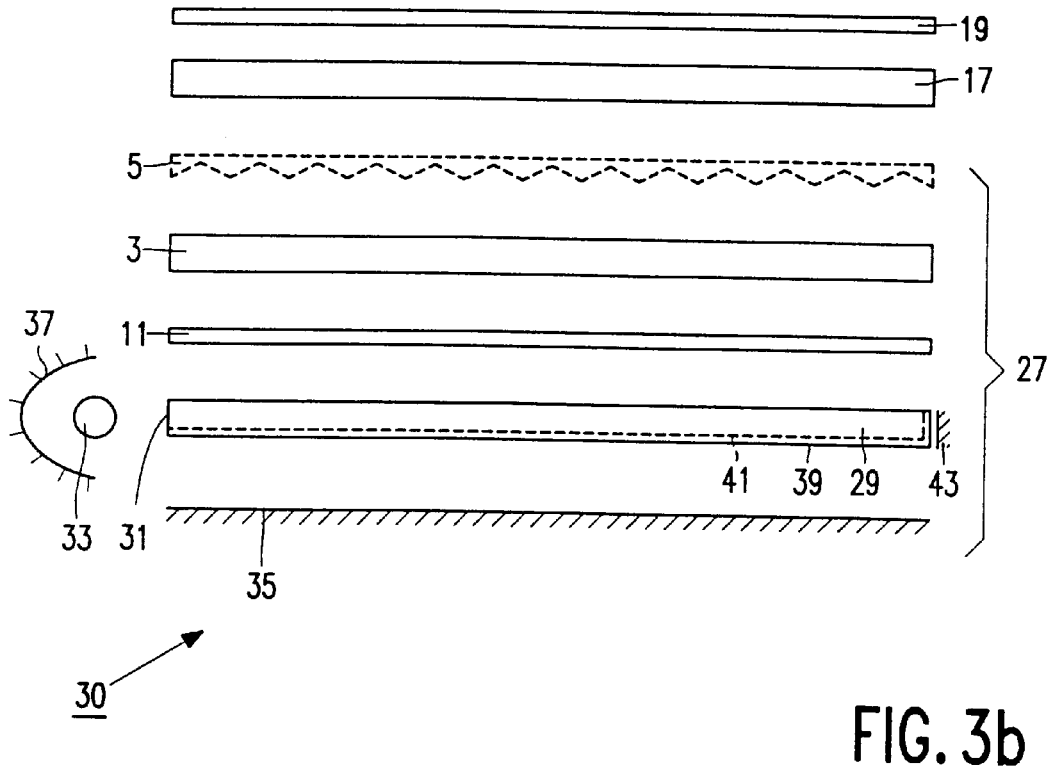

FIG. 3(b) shows an embodiment of a flat picture display device 30 of the type using peripheral lighting. The picture display device 30 comprises an illumination system 27, a picture display panel 17 and an analyzer 19. The illumination system 27 comprises an optical guide 29 in optically transparent material, in which light coming from a light source 33 can be coupled into at least one end face 31, which light source is arranged opposite this end face. Instead of coupling light into one end face, it is possible to couple light into more end faces so that a greater brightness of the picture display device is achieved. Moreover, a reflector 35 is arranged under the optical guide 29. The radiation source 33 is also surrounded by a reflector 37 so as to absorb the light transmitted by the light source 33 outside the optical guide 29 and send it as yet towards the optical guide 29. For example, the surface 39 of the optical guide 29 facing away from the picture display panel 17 is provided with a dot pattern 41 of (diffusely) reflecting material. The density and size of the dots increases as the distance to the light source 33 in the optical guide 29 increases. Such a plate is known per se, for example from U.S. Pat. No. 4,985,809. Light which leaves the optical guide in the direction of the reflector 35 will be sent as yet towards the picture display panel by the reflector. A reflecting layer 43 may be provided on the end faces of the optical guide, opposite which there is no light source, so as to prevent light from exiting from the optical guide at these end faces so that it cannot contribute to the formation of the picture.

In this case, the optical system is constituted by the depolarizing element 11, the polarizing element 3, the reflector 35 and, dependent on the implementation of the polarizing element, the flat element 5. The operating principle of the picture display device is analogous to that of the picture display device shown in FIG. 3(a).

Figure 4:
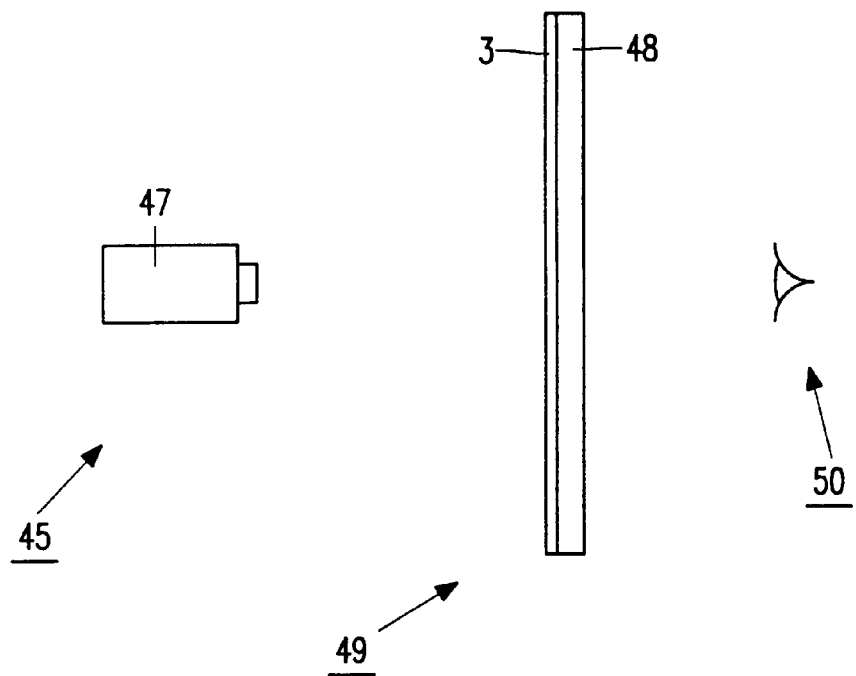
FIG. 4 shows an embodiment of an image projection device according to the invention, with a rear-projection screen.

The optical system according to the invention may be used to great advantage in an image projection device with a rear-projection screen. FIG. 4 shows an embodiment of such an image projection device 45. The device 45 comprises a projector 47 and an image projection screen 49. The image projection screen 49 comprises an optically transparent plate 48 which is provided with the required lens structures for horizontal and/or vertical spread of light into the audience space. If the projector is an LCD projector, in other words, if the picture display system of the projector comprises a liquid crystalline picture display panel, the projector supplies polarized light, hereinafter referred to as signal light. However, in addition to the signal light, ambient light is also incident on the image projection screen, which light will be diffused in the audience space 50. In order that an image can be observed which is rich in contrast, the ambience of the screen should be darkened to a great extent. By providing the screen 49 with a polarizing element 3 according to the invention, in which the polarizing element diffuses the signal light towards the audience, it is even not necessary to darken the ambience. A polarizing element 3 implemented similarly as that shown in FIG. 2 will pass substantially 50% of the ambient light so that approximately 50% less light is diffused towards the audience, as compared with an isotropic diffusing element.

It should be noted that it is known per se to provide an image projection screen with a polarizer so as to suppress approximately 50% of the ambient light, for example, by means of a cholesteric filter as described in U.S. Pat. No. 5,486,884. Advantages of the use of a polarizing element as compared with a cholesteric filter are that the polarizing effect is independant of the direction and wavelength of the incident light, and that the beam shape can be influenced, in other words, the diffusion profile of the polarizing element can be influenced by adapting the shape of the particles.

Figure 5:
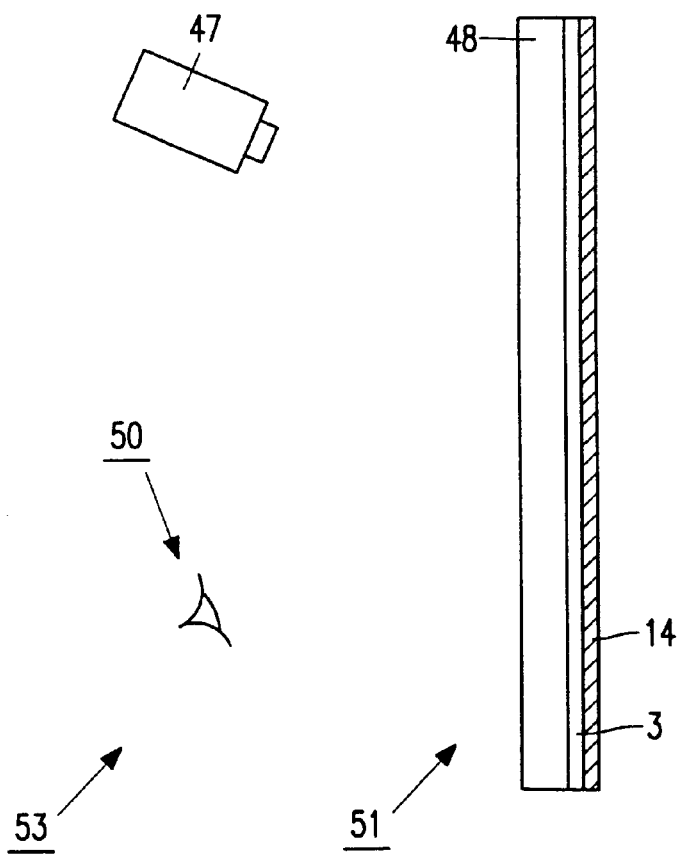
FIG. 5 shows an embodiment of an image projection device according to the invention, with a front-projection screen.

FIG. 5 shows an embodiment of an image projection device using a frontprojecttion screen. The screen comprises a plate 48 as a support for the required lens structures. If the projector 47 is an LCD projector and consequently supplies polarized light, the signal light will be reflected by the screen 51 if the polarizing element 3 is implemented in the way as that in FIG. 1 and if the direction of polarization which is reflected corresponds to that of the signal light. In this way, only approximately 50% of the ambient light will be reflected, whereas the other 50% of the ambient light will be passed by the polarizing element 3. By providing an absorbing element 14 behind the polarizing element 3, viewed from the audience space 50, the ambient light passed by the polarizing element 3 is absorbed. In this way, a relatively high image contrast can be achieved.

Figure 6:
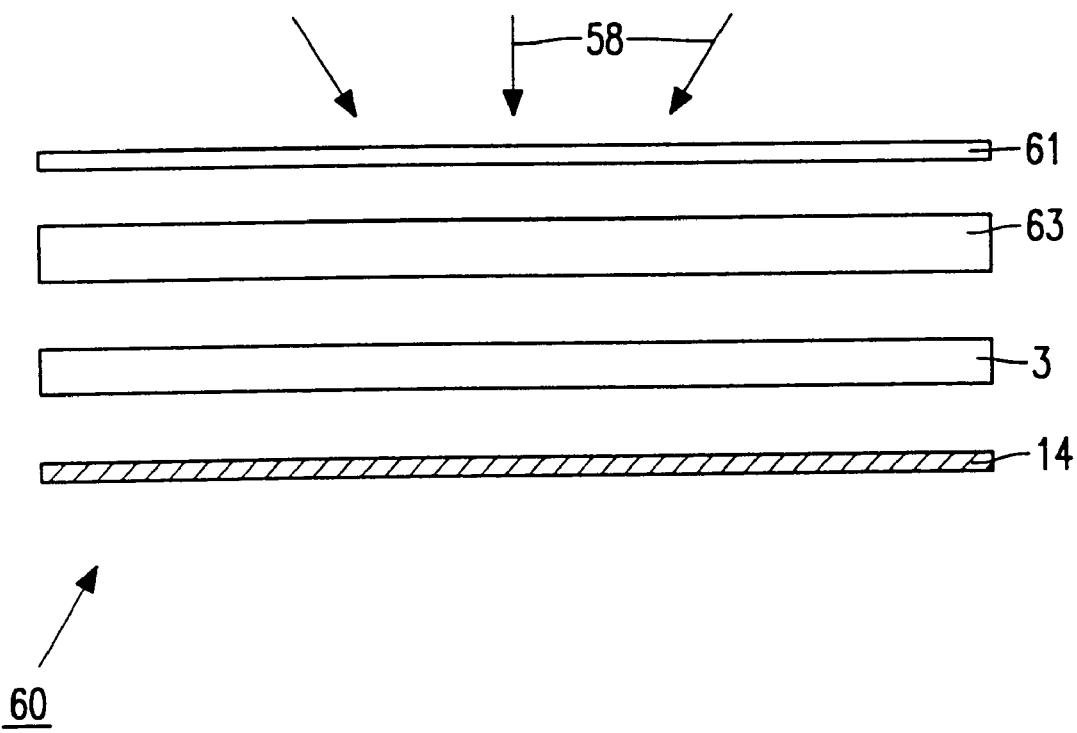
FIG. 6 shows an embodiment of a flat picture display device which is illuminated by ambient light.

A polarizing element of the type shown in FIG. 1 may also be used in a flat picture display device operating with ambient light. Such a device is shown in FIG. 6 and comprises an analyzer 61, a picture display panel 63, a polarizing element 3 and an absorbing element 14. Approximately half of the ambient light incident on the device 60 will be obstructed by an analyzer 61. The other half is incident on the picture display panel 63 and will be modulated in conformity with the picture information to be displayed. At the location of unenergized pixels, the picture display panel will pass this direction of polarization undisturbed. The light then reaches the polarizing element which is to reflect this direction of polarization. The panel is in the bright state at the location of such pixels. At the location of energized pixels, the direction of polarization of the incident light will be modulated in conformity with the picture information to be displayed. Consequently, the direction of polarization will change so that this light is no longer reflected by the polarizing element 3 but is passed and consequently reaches the absorbing element 14 where it will be absorbed. Dark picture portions will be formed at the location of these pixels.

It is further possible to add a dye to the material of the polarizing element. A polarizing color filter can be realized in this way.

Some examples of materials from which the polarizing element 3 can be made will now be described. A distinction will be made between systems with an isotropic continuous phase and an anisotropic dispersed phase, on the one hand, and systems with an anisotropic matrix in which an isotropic phase is dispersed, on the other hand. Polymer materials are chosen for the continuous phases. The dispersed phase may be both a polymer and an inorganic glass.

In a system with an isotropic continuous phase and an anisotropic dispersed phase, the continuous phase may consist of, for example an amorphous polymer such as, for example PMMA (polymethyl methacrylate), PS (polystyrene), PC (polycarbonate), COC (cyclic olephine copolymers), PES (polyether sulphone) but also crosslinked acrylates, epoxides, urethane and silicone rubbers.

For the dispersed phase, use is preferably made of a liquid crystalline material. The alignment of the orientation along the macroscopic preferred direction can be realized by means of an electric or a magnetic field, but also by mechanical deformation of the droplets to, for example ellipsoids so that there is no alignment due to interface tensions. The orientation thus achieved can subsequently be frozen in situ by crosslinking the reactive LC molecules. The desired distribution of the dispersed phase can be achieved by admixing in the polymer matrix or admixing in the monomer matrix. If a monomer matrix is used, the phase separation may be induced by polymerization of the matrix (PDLC: polymer dispersed liquid crystal) or by polymerization of the reactive LC molecules.

Another possibility for the dispersed phase consists of fibers of, for example PET (polyethylene terephthalate), PEN (polyethylene naphthalate) or Nylon. The fibers are divided into relatively short pieces and subsequently admixed. The microscopic alignment is realized by stretching the composite so that, due to their anisotropic direction, the fibers will be oriented in the direction of stretching. The fibers may also be incorporated quasi-continuously with their full length in a matrix comprising a thermoplastic or a thermosetting agent. In this case, stretching will not be necessary because the fibers maintain their imposed orientation during impregnation. For one given direction of polarization, the refractive indices of the dispersed phase and of the continuous phase should be substantially equal to each other. Matrix polymers are available in a range between $n=1.33$ (for Teflon AF) and $n=1.64$ (for PES). In principle, both the ordinary and the extraordinary refractive index of the dispersed phase may be rendered equal to the refractive index of the continuous phase.

A system with an anisotropic continuous phase and an isotropic dispersed phase can be realized by means of, for example a mixture of two thermoplastic polymers, for example PET and COC. The mixing ratio determines the concentration of diffusing particles. By way of example, PET will constitute the continuous phase. The mixing time is, for example 1 to 2 minutes and the mixing temperature is 250–270° C. In this way, a relatively fine dispersion of COC can be achieved. The mixture can be pressed or extruded to form a foil. The foil is subsequently uniaxially stretched with an effective tension difference in the foil of at least 10 MPa at a temperature which is preferably lower than 90° C. The foil is then further cooled down to room temperature while maintaining a constant tension. In this way, the continuous PET phase becomes birefringent, at which $\Delta n=0.12$ at 10 MPa, with $n_o=1.53$ and $n_e=1.65$. The COC will also be subjected to a load before stretching itself occurs. It is therefore desirable to choose a COC having a low glass-transition temperature which is lower than that of PET. In that case, the dispersed COC phase can easily deform together with a matrix. The tension in the COC phase then remains low so that there will be no cavitation at the interface. The refractive index of COC is relatively insensitive to tensions so that the refractive index will differ to a slight extent from 1.53 and is thus substantially equal to $n_o$ of PET. Cavitation on the interface is not desirable because there will be dispersion for both polarization components in that case, resulting in a decrease of the contrast.

Instead of PET in combination with COC, it is alternatively possible to use PEN together with PMMA. A higher birefringence can be realized with this combination, so that the refractive index of PMMA (n=1.49) can be rendered equal to $n_o$. The stretching temperature is now also higher (>100° C.).

Yet another possibility is to use preformed particles as a dispersed phase. Such particles may be, for example core-shell rubber particles or polymer particles which are obtained, for example, by means of emulsion polymerization. The particle size can be adjusted by setting the conditions of polymerization. Consequently, the particle size is independent of the mixing technique and constant throughout the operating steps. Soft particles have the advantage that cavitation will not readily occur. Instead of polymer particles, inorganic particles such as, for example, glass granules or fibers may be mixed. There is a relatively wide choice of the refractive index so that, in principle, the refractive index of the particles can be rendered equal to both no and ne. The particle size may be determined in advance in conformity with the desired diffusion pattern. The optical anisotropy of the matrix is obtained by uniaxially stretching the composite, as described hereinbefore.

We claim:

1. An optical system comprising a source of unpolarized light having a wavelength $\lambda$ and a polarizing element in the form of a layer comprising an isotropic material having a refractive index $n_i$ and an anisotropic material which separates said unpolarized light into an ordinary polarization component and an extraordinary polarization component, said anisotropic material having refractive indices $n_{a,e}$ and $n_{a,o}$, in which $n_i$ is substantially equal to $n_{a,e}$ or $n_{a,o}$, whereby one of said polarization components is diffused in the polarizing element to form a diffused polarization component, the optical system further comprising means for retroreflecting at least a part of the diffused polarization component toward the source of unpolarized light.

2. An optical system as claimed in claim 1, wherein the means for retroreflecting is the anisotropic material, the anisotropic material being formed by particles separated by a distance d for which it holds that:

$$0.5\lambda < \phi < 10\lambda$$

in which $\phi$ is the maximum dimension of the particles, and it holds for the distance d between the particles that:

$$10\lambda > d > 0.5\lambda$$

and it further holds that:

$$0.3 > |n_i - n_{a,e}| > 0.01.$$

3. An optical system as claimed in claim 1, wherein the means for retroreflecting comprises a flat element which is provided with a relief structure facing the polarizing element, said element having a reflective effect for light rays with an angle of incidence which is larger than a critical angle $\Theta_c$.

4. An optical system as claimed in claim 1, wherein $0 \leq |n_i - n_{a,o}| < 0.05$.

5. An optical system as claimed in claim 1, 3 or 1 wherein the optical system further comprises conversion means for at least partly converting the diffused polarization component into a complementarily polarized component.

6. An optical system as claimed in claim 5, characterized in that the conversion means comprises a depolarizer and a reflector.

7. An optical system comprising a source of unpolarized light having a wavelength $\lambda$ and a polarizing element in the form of a layer comprising an isotropic material having a refractive index $n_i$ and an anisotropic material which separates said unpolarized light into an ordinary polarization component and an extraordinary polarization component, said anisotropic material having refractive indices $n_{a,e}$ and $n_{a,o}$, in which $n_i$ is substantially equal to $n_{a,e}$ or $n_{a,o}$, whereby one of said polarization components is diffused in the polarizing element to form a diffused polarization component, and wherein the anisotropic material is formed by particles separated by a distance d for which it holds that:

$$0.5\lambda < \phi < 10\lambda$$

in which $\phi$ is the maximum dimension of the particles, and it holds for the distance d between the particles that:

$$10\lambda > d > 0.5\lambda$$

and it further holds that:

$$0.3 > |n_i - n_{a,e}| > 0.01.$$

whereby at least part of the diff-used polarization component is retroreflected toward the source of unpolarized light.

8. An optical system as in claim 7 wherein $0 \leq |n_i - n_{a,e}| < 0.05$.

9. An optical system as in claim 7 wherein the optical system further comprises conversion means for at least partly converting the diffused polarization component into a complementarily polarized component.

10. An optical system as in claim 9 wherein the conversion means comprises a depolarizer and a reflector.

11. An optical system comprising a source of unpolarized light, a polarizing element in the form of a layer comprising an isotropic material having a refractive index $n_i$ and an anisotropic material which separates said unpolarized light into an ordinary polarization component and an extraordinary polarization component, said anisotropic material having refractive indices $n_{a,e}$ and $n_{a,o}$, in which $n_i$ is substantially equal to $n_{a,e}$ or $n_{a,o}$, whereby one of said polarization components is diffused in the polarizing element to form a diffused polarization component, and means for retroreflecting at least part of the diffused polarization component toward said source of unpolarized light, said means comprising a flat element with a relief structure facing said polarizing element oppositely from said light source, said relief structure reflecting light having an angle of incidence which is larger than a critical angle $\Theta_c$.

12. An optical system as in claim 11 wherein $0 \leq |n_i - n_{a,e}| < 0.05$.

13. An optical system as in claim 11 further comprising conversion means for at least partly converting the diffused polarization component into a complementarily polarized component.

14. An optical system as in claim 13 wherein said conversion means comprises a depolarizer and a reflector.

* * * * *